United States Patent
Varatharajan et al.

(10) Patent No.: US 12,249,934 B2
(45) Date of Patent: Mar. 11, 2025

(54) SYSTEMS AND METHODS FOR REACTIVE POWER INJECTION BASED FLYING START OF SYNCHRONOUS MACHINES

(71) Applicant: Mitsubishi Electric Research Laboratories, Inc., Cambridge, MA (US)

(72) Inventors: Anantaram Varatharajan, Cambridge, MA (US); Yebin Wang, Cambridge, MA (US); Abraham Goldsmith, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 131 days.

(21) Appl. No.: 18/196,571

(22) Filed: May 12, 2023

(65) Prior Publication Data
US 2024/0380346 A1 Nov. 14, 2024

(51) Int. Cl.
H02P 21/34 (2016.01)
H02P 21/18 (2016.01)

(52) U.S. Cl.
CPC .............. *H02P 21/34* (2016.02); *H02P 21/18* (2016.02); *H02P 2207/05* (2013.01)

(58) Field of Classification Search
CPC ....... H02P 21/34; H02P 21/18; H02P 2207/05
USPC ........................................................ 318/778
See application file for complete search history.

(56) References Cited

U.S. PATENT DOCUMENTS

| 10,439,526 B2 | 10/2019 | Tian |
| 10,819,264 B1 | 10/2020 | Bojoi et al. |
| 2021/0111647 A1 | 4/2021 | Kalygin et al. |

OTHER PUBLICATIONS

Liao et al. (CN 104518520 A) The Renewable Energy Source to Drive The Power Generation Unit Control Method and Device (Year: 2015).*
Hedgeds (CN 85105328 A) Starting and Protecting for Induction Motor (Year: 1987).*
Meng et al. (CN 107069728 A) Non-harmonic Detection Control Three-level Active Power Filter Compensation Current Calculation Method (Year: 2017).*

(Continued)

*Primary Examiner* — Jorge L Carrasquillo
(74) *Attorney, Agent, or Firm* — Gene Vinokur

(57) ABSTRACT

A cascaded controller for controlling a kinetic three-phase synchronous machine comprises a current control circuitry and an active power control circuitry operatively coupled with the current controller circuitry. The current control circuitry is configured to regulate a magnitude of inrush stator current for a stator of the kinetic three-phase synchronous machine by producing a first voltage control signal causing a flow of active power in the kinetic three-phase synchronous machine. The active power control circuitry is configured to produce a second voltage control signal to reduce the active power to zero, based on the first voltage control signal. The second voltage control signal controls a phase angle of the inrush stator current such that the stator current vector is oriented to align with a magnet axis of the rotor.

16 Claims, 9 Drawing Sheets

(56) References Cited

OTHER PUBLICATIONS

K.-M. Choo and C.-Y. Won, "Flying Start of Permanent-Magnet-Synchronous-Machine Drives Based on a Variable Virtual Resistance," IEEE Transactions on Industrial Electronics, vol. 68, No. 10, pp. 9218-9228, 2021, doi: 10.1109/TIE.2020.3020019.

S. Taniguchi, S. Mochiduki, T. Yamakawa, S. Wakao, K. Kondo, and T. Yoneyama, "Starting procedure of rotational sensorless PMSM in the rotating condition," IEEE Trans Ind Appl, vol. 45, No. 1, pp. 194-202, 2009, doi: 10.1109/TIA.2008.2009496.

Y. S. Lee, K. M. Choo, W. S. Jeong, C. H. Lee, J. Yi, and C. Y. Won, "A Virtual Impedance-Based Flying Start Considering Transient Characteristics for Permanent Magnet Synchronous Machine Drive Systems," Energies (Basel), vol. 16, No. 3, Feb. 2023, doi: 10.3390/en16031172.

\* cited by examiner

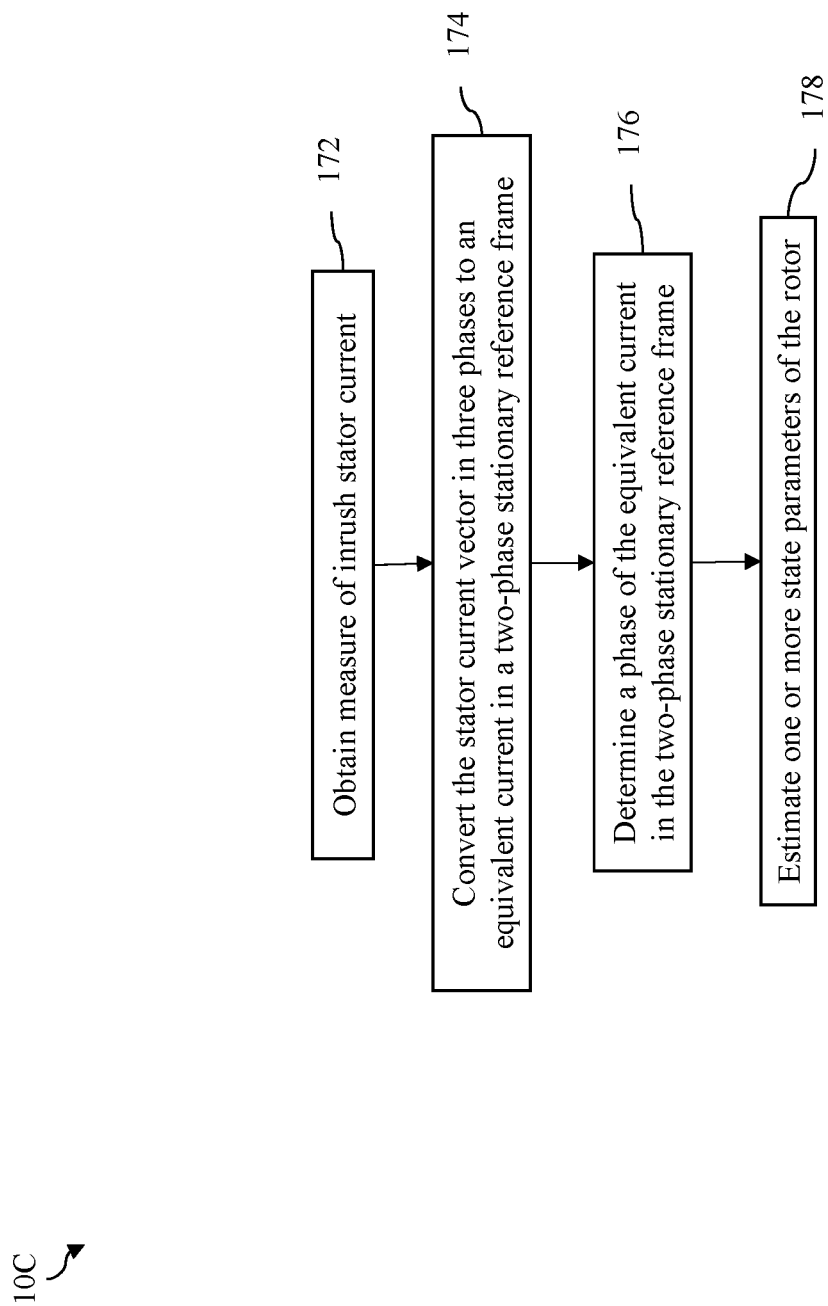

SYSTEMS AND METHODS FOR REACTIVE POWER INJECTION BASED FLYING START OF SYNCHRONOUS MACHINES

FIELD

The present disclosure relates generally to electric motors, and more particularly to a system and a method for controlling an electric motor without a position sensor.

BACKGROUND

Synchronous machines such as motors often encounter interruption in rotation of the rotor due to several reasons. Sometimes such interruptions are due to operational constraints such as power supply interruption while sometimes they may be deliberately executed such as when operated in a non-continuous manner in a factory operation. Each such interruption involves powering off followed by a delay and then powering on of the motor. The delay is often so short that the rotor continues to be in a state of rotational motion during the delay duration and when powering up at the end of the delay duration, the rotor is still in kinetic state. Flying start refers to powering up and controlling a motor when the initial mechanical state is non-stationary, i.e., the motor is kinetic and already rotating. This can occur, for instance, when there is a temporary power interruption in a motor drive system and the rotor continues to rotate due to the inertia of the shaft when power is restored. In order to perform flying start of a synchronous machine such as a motor, an accurate measure of initial mechanical states such as the position and rotational speed of the rotor is required. Normally, the initial mechanical speed and position are obtained from a position transducer/sensor. However, quite often downsizing of the motor drive may be desired for compactness or other reasons leading to elimination of such measurement sensors. For example, owing to cost and convenience factors, position sensors are not incorporated in sensorless motor drives. As a result, the initial mechanical states must be estimated instead of measured.

The knowledge of initial rotor position is vital in the starting and engaging the closed-loop field-oriented-control of a synchronous machine, particularly permanent magnet synchronous machines (PMSM). To engage field-oriented control of a PMSM in motion, the inverter's initial PWM output voltage must match the back EMF produced by the rotating magnets such that the voltage difference is zero to limit inrush current. Such feed-forward voltage compensation requires accurate knowledge of the initial rotor position and speed, which is difficult to obtain in sensorless motor drives without position sensors. This lack of knowledge can lead to large inrush currents at high speeds when the inverter is enabled without proper feed-forward compensation. The PMSM operates in a regenerative mode, which can cause the load to experience strong braking torque that is undesirable.

Thus, it is necessary to develop sensorless flying start techniques that enable a sensorless motor drive system to estimate the initial mechanical states under non-stationary conditions, regulate the inrush current, and prevent the braking torque. This technique would ultimately allow the system to engage in stable closed-loop control.

SUMMARY

It is an objective of some embodiments to provide a system and a method for estimating an initial rotor position and velocity of an electric motor without a position sensor/transducer. It is also an objective of some embodiments to provide an initial position and velocity estimation method, which has minimal disturbances on the load and has minimal reliance on the motor parameters, for estimating an initial position and velocity of a rotor of the electric motor.

It is a realization of some example embodiments that flying start of synchronous machines such as motors requires precise measurement of the initial mechanical states of the rotor. The initial mechanical states include amongst other things, the position and rotational speed of the rotor. It is also a realization of some example embodiments that precise measurement of the initial mechanical states requires sensors and associated electronics which in turn are embodied as separate modules in the motor drive. Due to operational constraints, such modules may be required to be completely eliminated from the drive. Some example embodiments also realize that such an elimination also removes the capability to measure the initial mechanical state of the rotor, thereby subjecting the motor to an improper approach for flying start.

It is a realization of some example embodiments that some applications or operating instances of the motor have non-zero initial rotor speed (e.g., a brief power interruption to a high inertial motor system). Some example embodiments realize that the knowledge of initial rotor position is vital in the starting and engaging the closed-loop field-oriented-control of a synchronous machine, for example permanent magnet synchronous machines (PMSM). Some example embodiments are based on the realization that to engage field-oriented control of a PMSM in motion, the inverter's initial PWM output voltage should match the back EMF produced by the rotating magnets such that the voltage difference is zero to limit inrush current. Such feed-forward voltage compensation requires precise knowledge of the rotor position and speed. This is challenging for motor drives without a position sensor/transducer, commonly referred to as sensorless drives, where the measurements of the initial states are unavailable. The estimation of initial states requires enabling the inverter with the lack of proper feed-forward compensation and this prompts large inrush currents at high speeds. Thus, the sensorless flying start is a key feature that refers to the capability of a sensorless motor drive system to estimate the initial mechanical states under non-stationary conditions and engage in stable closed-loop control.

Some example embodiments realize that the initial back EMF may be measured with a voltage sensor for adequate feed-forward compensation. However, the choice of replacing a position sensor with a voltage sensor defeats the purpose of sensorless control such as cost, reliability, and redundancy. Some example embodiments also realize that another approach for estimating the rotor position would be high frequency voltage injection. However, such an approach is limited to low speeds and for machines with saliency. Moreover, the large inrush current problem at high speeds would still persist with such an approach.

Some example embodiments are based on another realization that an approach comprising the injection of short pulses of zero voltage followed by an estimation of the position and speed from the current response of the motor relies on motor parameters and subjects load to jerk-like disturbances. Some example embodiments also consider that emulating the inverter as a resistive load in the form of a virtual resistance curbs the inrush current. However, it is also a realization that such virtual resistance-based approach subjects the load to a continuous braking torque and is mostly limited to non-salient machines.

Some example embodiments are directed towards a flying start method that estimates the initial mechanical states while imposing minimal disturbances on the load during the estimation process, i.e., the braking torque is substantially close to zero. Such a method provides the benefit of being independent of the machine parameters. Some example embodiments achieve this via reactive power injection and regulating the active power (and hence, the braking torque) to zero. As discussed, the proposed method introduces zero braking torque on the rotor for flying start, hence the impact on the driven load is minimal. Some example embodiments also provide an improved control structure in the stator current reference frame, wherein the position observer converges with zero steady-state error. The proposed technique is resilient to stator resistance variations.

To achieve such objectives, some example embodiments disclosed herein provide a cascaded topology of the motor drive, the topology comprising two cascaded controllers. A first controller referred to as a current controller regulates the magnitude of the inrush stator current to a predetermined value by producing a voltage control signal. This causes an active power flow in the motor, generating braking torque. A second controller, referred to as an active power controller, produces voltage control signal to reduce the active power to zero. Despite seeming like the objective of the second controller is to counteract the output of the first controller, it actually involves orienting the phase of the stator current vector to align with the magnet axis where the torque is zero, thereby resulting in zero mechanical active power and purely reactive power. Essentially, the first controller controls the magnitude of the stator current while the second controller controls the phase angle of the stator current. Together, these two controllers work in conjunction to restrict the inrush current magnitude and maintain zero mechanical active power. As a result, the stator current vector automatically synchronizes with the rotor, aligning with the magnet axis and sharing the same angular velocity. By monitoring the stator current vector, the system can estimate the initial mechanical states accurately without requiring any other measurement sensor.

The present disclosure provides a control system that includes a feedback controller, a modulator, a Voltage Source Inverter (VSI), an electric motor under test and a position observer. The VSI is powered by a DC voltage source. The electric motor may be powered by a DC voltage using the VSI. The feedback controller is configured to generate a reference voltage vector for the electric motor. The modulator is configured to generate duty cycles based on a DC-link voltage to modulate DC voltage according to the reference voltage vector such that a modulated voltage powering the electric motor reduces an error between a reference value of states of an operation of the electric motor and a corresponding estimated value of the states of operation of the electric motor. The states of operation of the electric motor includes the stator current magnitude of the electric motor and the active mechanical power of the electric motor.

The current controller generates a voltage vector signal to reduce the error between the reference stator current magnitude and the measured stator current magnitude. An estimate of the active power is computed based on the voltage vector output of the first controller. This active power estimate is the input to the active power controller that generates a second voltage vector signal to reduce the estimated active power to zero. The cumulative of the two voltage vectors is given to the modulator to generate corresponding duty cycles for the PWM modulation of the VSI.

A position observer is used to track the stator current vector with a phase-locked-loop (PLL) to estimate the mechanical speed and position of the electric motor.

In order to achieve the aforementioned objectives and advantages, some example embodiments provide systems and methods for controlling a kinetic three-phase synchronous machine.

For example, some example embodiments provide a cascaded controller for controlling a kinetic three-phase synchronous machine. The cascaded controller comprises a current control circuitry and an active power control circuitry operatively coupled with the current controller circuitry. The current control circuitry is configured to regulate a magnitude of inrush stator current for a stator of the kinetic three-phase synchronous machine by producing a first voltage control signal causing a flow of active power in the kinetic three-phase synchronous machine. The active power control circuitry is configured to produce a second voltage control signal to reduce the active power to zero, based on the first voltage control signal. The second voltage control signal controls a phase angle of the inrush stator current such that the stator current vector is oriented to align with a magnet axis of the rotor.

Some example embodiments also provide a control method for controlling a kinetic three-phase synchronous machine. The method comprises producing a first voltage control signal causing a flow of active power in the kinetic three-phase synchronous machine to regulate a magnitude of inrush stator current for a stator of the kinetic three-phase synchronous machine. The method further comprises producing a second voltage control signal to reduce the active power to zero, based on the first voltage control signal. The second voltage control signal controls a phase angle of the inrush stator current such that the stator current vector is oriented to align with a magnet axis of the rotor.

Some example embodiments also provide a control system for controlling an electric motor. The control system comprises a feedback controller configured to generate a reference voltage vector for the electric motor. The reference voltage vector comprises a first component that causes a flow of active power in the electric motor and a second component that reduces the active power to zero. The control system also comprises a modulator configured to generate duty cycles based on a DC link voltage to modulate the DC voltage according to the reference voltage vector such that a modulated voltage powering the electric motor reduces an error between a reference value of a state of operation of the electric motor and a corresponding estimated value of the state of operation of the electric motor.

BRIEF DESCRIPTION OF DRAWINGS

The presently disclosed embodiments will be further explained with reference to the following drawings. The drawings shown are not necessarily to scale, with emphasis instead generally being placed upon illustrating the principles of the presently disclosed embodiments.

FIG. 1C illustrates a flowchart of a method performed by a position observer of the control system of FIG. 1A, according to some example embodiments;

Figure 1A:
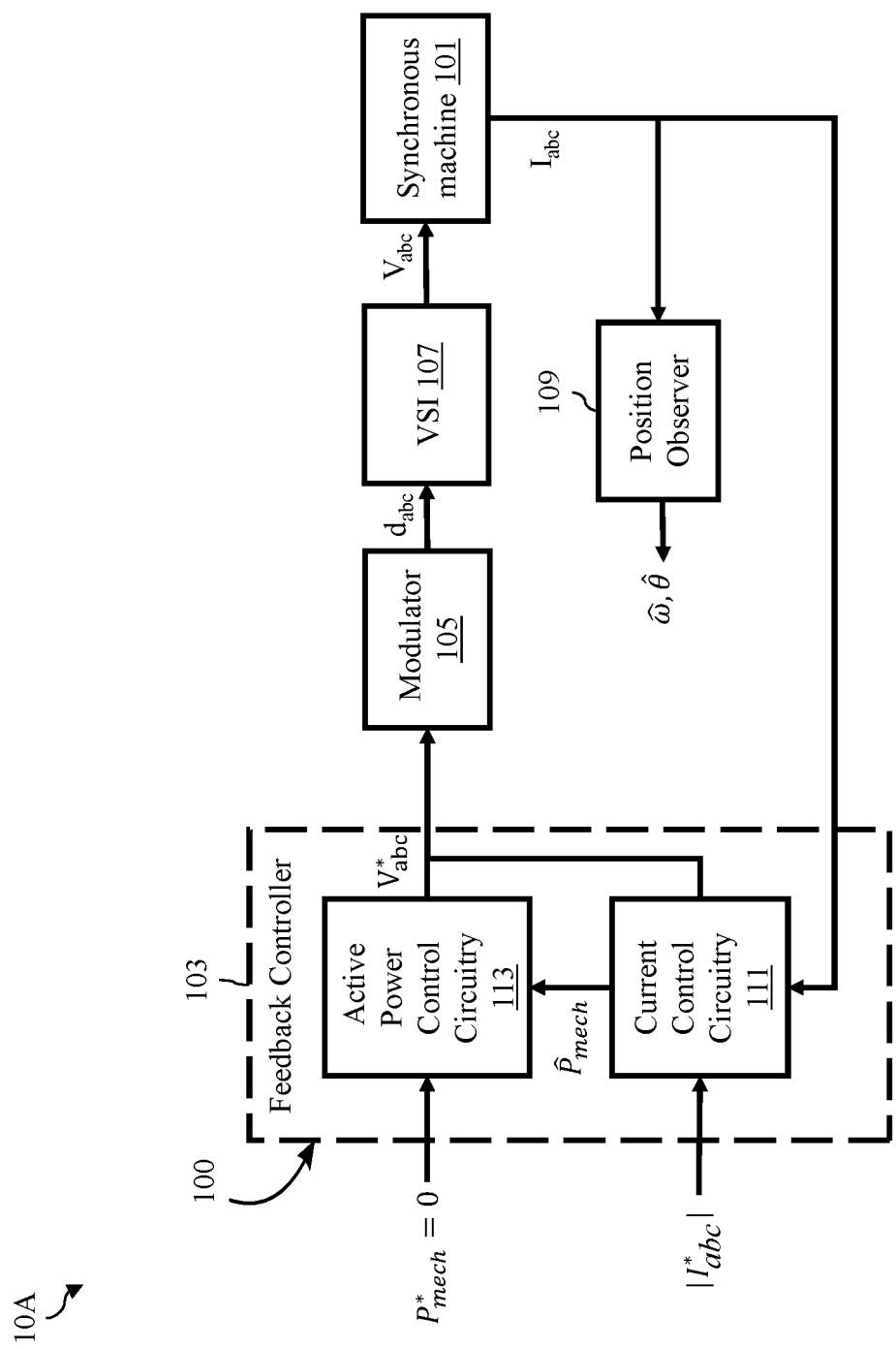
FIG. 1A illustrates a block diagram of a control system for controlling a three-phase synchronous machine, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like-reference numbers and designations in the various drawings may indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Flying start refers to powering up and controlling a motor when the initial mechanical state is non-stationary, i.e., the motor is kinetic and already rotating. This can occur, for instance, when there is a temporary power interruption in a motor drive system and the rotor continues to rotate due to the inertia of the shaft when power is restored. In order to perform flying start of a synchronous machine such as a motor, an accurate measure of initial mechanical states such as the position and rotational speed of the rotor is required. Normally, the initial mechanical speed and position are obtained from a position transducer/sensor. However, quite often downsizing of the motor drive may be desired for compactness or other reasons leading to elimination of such measurement sensors.

To engage field-oriented control of a PMSM in motion, the inverter's initial PWM output voltage must match the back EMF produced by the rotating magnets such that the voltage difference is zero to limit inrush current. Such feed-forward voltage compensation requires accurate knowledge of the initial rotor position and speed, which is difficult to obtain in sensorless motor drives without position sensors.

Example embodiments described herein provide systems, methods, and controllers for reactive power injection based flying start of such sensorless synchronous machines. It is an objective of some embodiments to provide a system and a method for estimating an initial rotor position and velocity of an electric motor without a position sensor/transducer. It is also an objective of some embodiments to provide an initial position and velocity estimation method, which has minimal disturbances on the load and has minimal reliance on the motor parameters, for estimating an initial position and velocity of a rotor of the electric motor.

FIG. 1A illustrates a block diagram of a control system 10A for controlling a three-phase synchronous machine 101 such as an electric motor, according to some example embodiments. The control system 10A may be embodied as a drive for the synchronous machine. The control system comprises a feedback controller 103, a modulator 105, a Voltage Source Inverter (VSI) 107, and a position observer 109. The feedback controller 100 embodied as a cascaded controller comprises an active power control circuitry 113 (also referred to as active power controller) and a current control circuitry 111 (also referred to as current controller). The synchronous machine 101 may be an electric motor such as a synchronous motor in which, at steady state, rotation of its shaft is synchronized with frequency of supply current. Examples of synchronous motors include reluctance and permanent magnet motors. The VSI 107 is powered by a DC voltage source. The synchronous machine 101 may be powered by a DC voltage using the VSI 107.

According to some example embodiments, the feedback controller 103 is configured to generate a reference voltage vector ($V^*_{abc}$) for the synchronous machine 101. The modulator 105 is configured to generate duty cycles ($d_{abc}$) based on a DC-link voltage to modulate DC voltage according to the reference voltage vector such that a modulated voltage $V_{abc}$ powering the synchronous machine 101 reduces an error between a reference value of states of operation of the synchronous machine 101 and a corresponding estimated value of the states of operation of the synchronous machine 101. In some example embodiments, the state of operation of the synchronous machine 101 includes the stator current magnitude of the machine and the active mechanical power of the machine. For example, the state of operation of the synchronous machine 101 controlled by the current controller 111 is a stator current magnitude of the synchronous machine 101 and the state of operation of the synchronous machine 101 controlled by the active power controller 113 is the estimated active power ($\hat{P}_{mech}$) of the synchronous machine 101.

The reference stator current magnitude ($|I^*_{abc}|$) and a measured current ($I_{abc}$) of the synchronous machine 101 are input to the current controller 111. The reference stator current magnitude ($|I^*_{abc}|$) may be predefined or obtained from a memory. The measured current ($I_{abc}$) may be obtained by a suitable sensor for measuring electric current. The active power ($\hat{P}_{mech}$) is calculated based on the output voltage vector of the current controller 111 and is the input to the active power controller 113. The active power reference ($P^*_{mech}$) is set to zero. The output voltage vectors of the two controllers are summed to calculate the reference voltage ($V^*_{abc}$). The position sensor 109 tracks the stator current $I_{abc}$ to estimate the angular velocity $\hat{\omega}$ and the position $\hat{\theta}$ of the rotor of the synchronous machine 101. The various reference values used by example embodiments such as the reference stator current magnitude, the reference voltage reference value are predefined and are based on the stored machine parameters in non-volatile memory.

Some example embodiments consider that the synchronous machine 101 is a kinetic three-phase synchronous machine i.e., the synchronous machine is in motion. The current controller or current control circuitry 111 regulates the magnitude of inrush stator current for a stator of the kinetic three-phase synchronous machine by producing a first voltage control signal causing a flow of active power $\hat{P}_{mech}$ in the kinetic three-phase synchronous machine. The active power controller or active power control circuitry 113 is operatively coupled to the current control circuitry 111 and produce a second voltage control signal to reduce the active power to zero, in response to the first voltage control signal such that the second voltage control signal controls a phase angle of the inrush stator current such that a phase angle vector of the phase angle is oriented to align with a magnet axis of the rotor. A detailed working of various components of the control system 10A is described next with reference to FIG. 1B and FIG. 1C.

Figure 1B:
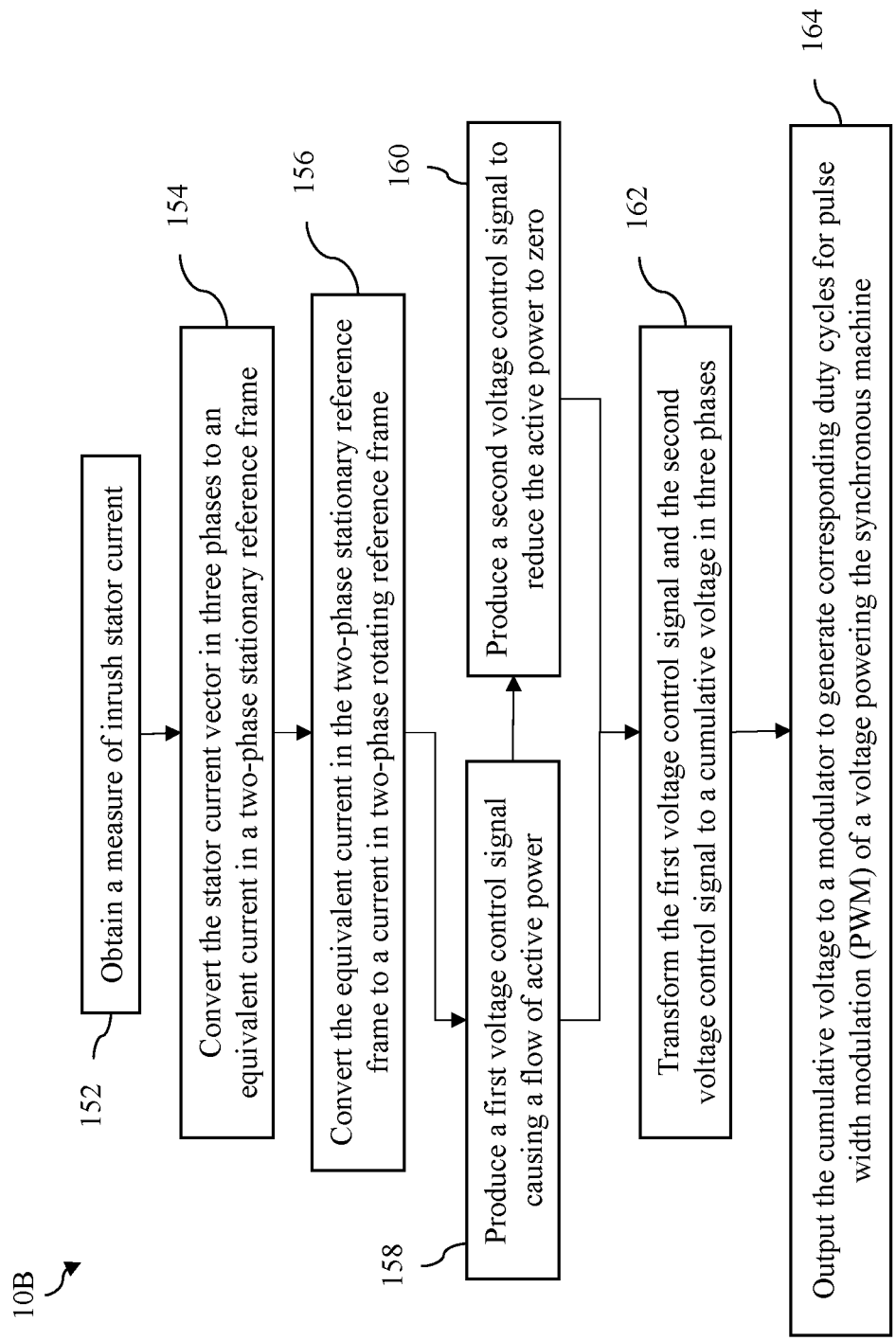
FIG. 1B illustrates a flowchart of a control method for controlling a three-phase synchronous machine, according to some example embodiments.

FIG. 1B illustrates a flowchart of a control method 10B for controlling a three-phase synchronous machine such as the machine 101, according to some example embodiments. FIG. 1C illustrates a flowchart of a method 10C performed by the position observer 109 of the control system 10A, according to some example embodiments. FIGS. 1B and 1C will be described with reference to FIG. 1A. Referring to FIGS. 1A and 1B, the method 10B comprises obtaining 152 a measure of the inrush stator current $I_{abc}$ of the synchronous machine 101, for example by using a suitable sensor. The measure of the inrush stator current is a stator current vector in three phases abc as is shown in FIG. 2B. The current controller 111 converts 154 the stator current vector in three phases abc to an equivalent current in a two-phase stationary reference frame $\alpha\beta$ as is shown in FIG. 2B, for example using the Clarke transformation. In this regard, the current controller 111 may comprise a suitable current converter circuitry configured to perform the conversion from three phases to two phases using the Clarke transformation. The two-phase stationary reference frame $\alpha\beta$ may be defined by an $\alpha$-axis aligned with an a axis of the three phases (abc) of the stator current vector and a $\beta$-axis orthogonal to the $\alpha$-axis as is shown in FIG. 2B. The equivalent current in the two-phase stationary reference frame ($\alpha\beta$) is further converted to a current in two-phase rotating reference frame ($i\tau$). In this regard the current converter circuitry may utilize the Park transformation such that the two-phase rotating reference frame ($i\tau$) is defined by an i-axis aligned with the stator current vector and a $\tau$-axis orthogonal to the i-axis, as is shown in FIG. 2B.

Referring back to FIG. 1, the method 10B further comprises producing 158 a first voltage control signal causing a flow of active power $\hat{P}_{mech}$ in the synchronous machine 101. The instantaneous active power is given by the product of stator current and voltage; as the stator reference frame is aligned with the i-axis, i.e., $i_\tau=0$, the net instantaneous active power in the system will be proportional to the i-axis voltage that is the output of the current controller 111. The flow of active power in the synchronous machine 101 generates braking torque for the rotor of the synchronous machine. The first voltage control signal is input to the active power control circuitry 113 which in turn produces 160 a second voltage control signal to reduce the active power to zero. Therefore, the i-axis voltage is fed to the $\tau$-axis active power controller 113 which is tasked to drive the i-axis voltage to zero (the stator resistance drop is feed-forward compensated) and consequently, driving the active mechanical power to zero. The reference voltages in the it frame are transformed back to the three-phase system using Park and Clarke transformations and is given to the modulator 105 to generate the respective duty cycles for the inverter 107. In this regard, the first voltage control signal and the second voltage control signal are transformed 162 into a cumulative voltage in three phases using the Park and Clarke transformation. The cumulative voltage in three phases $v^*_{abc}$ is output 164 by the cascaded feedback controller 103 to the modulator 105 to generate duty cycles $d_{abc}$ for modulating a voltage powering the synchronous machine.

Referring to FIG. 1C, the method 10C comprises obtaining 172 a measure of the inrush stator current $I_{abc}$ of the synchronous machine 101, for example by using a suitable sensor. The measure of the inrush stator current is a stator current vector in three phases. The stator current vector in three phases is converted 174 to an equivalent current in a two-phase stationary reference frame ($\alpha\beta$) using Clarke transformation in the same manner as described for step 154 of FIG. 1B. Thereafter, the position observer 109 of FIG. 1A may utilize a phase extraction circuitry to determine 176 a phase of the equivalent current in the two-phase stationary reference frame and estimate 178 one or more state parameters of the rotor of the synchronous machine 101 in any suitable manner. The one or more state parameters of the rotor may include a mechanical speed of the rotor, and a position of the rotor.

Figure 2A:
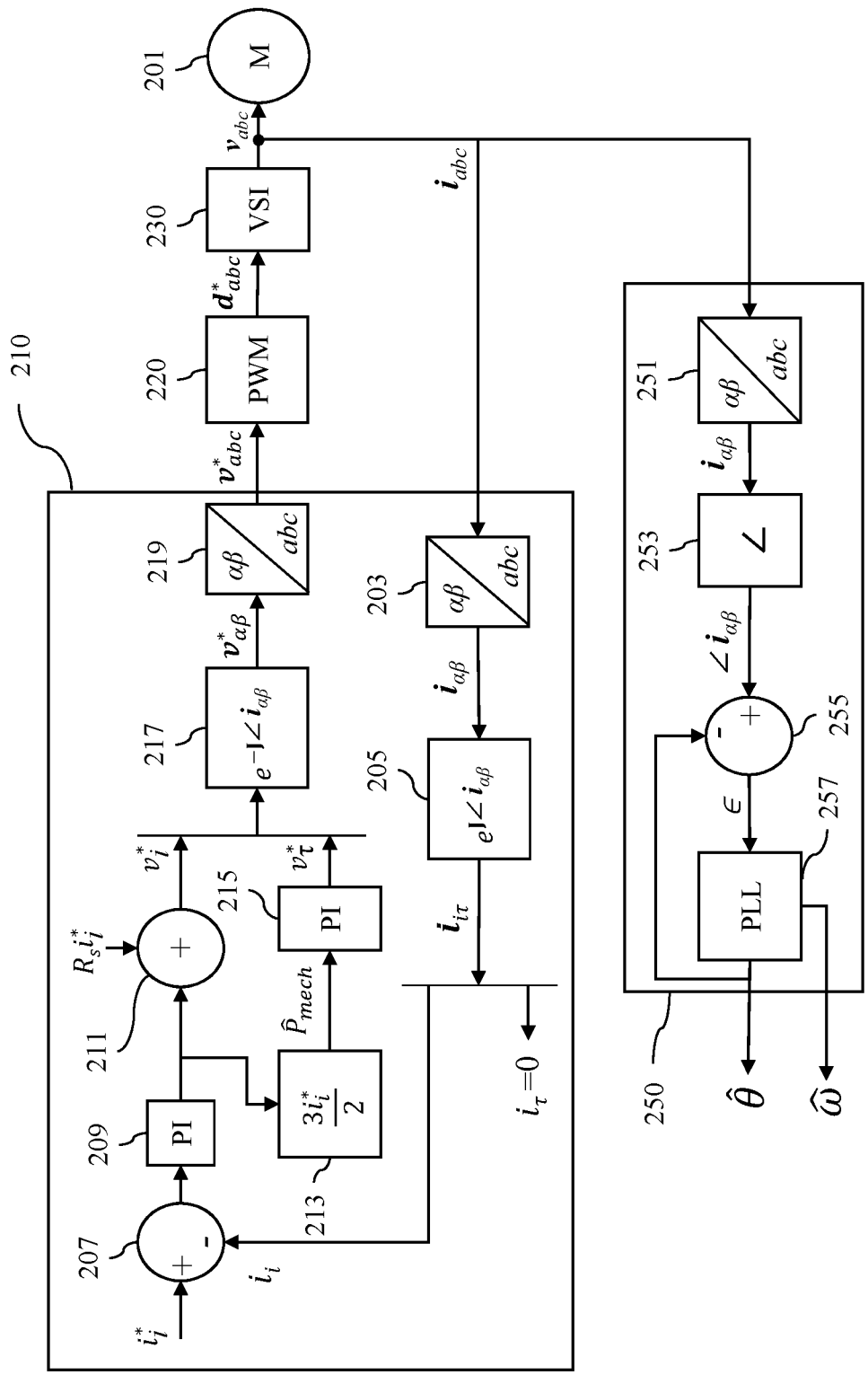
FIG. 2A illustrates a detailed representation of the control system of FIG. 1A, according to some example embodiments.
Figure 2B:
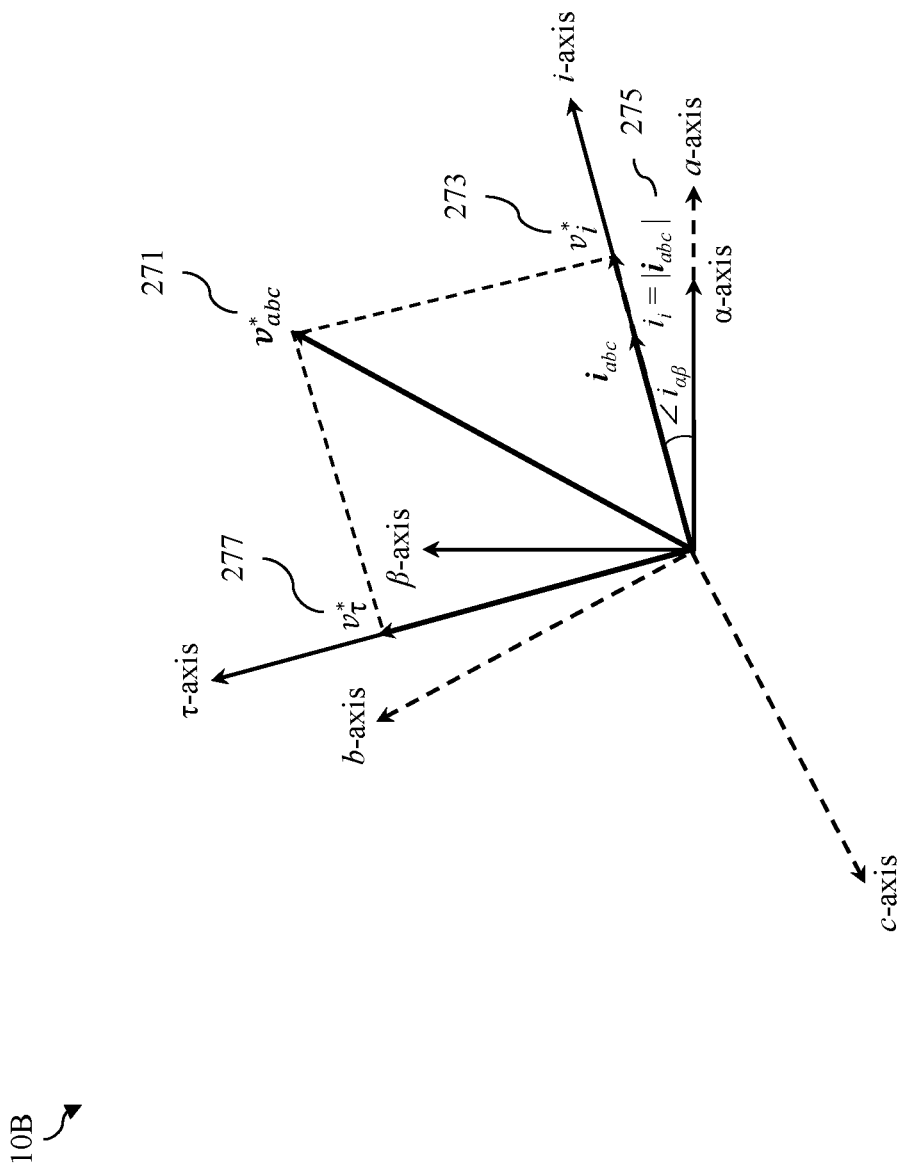
FIG. 2B illustrates a vector representation of the stator current reference frame, according to some example embodiments.

FIG. 2A illustrates a detailed representation of the control system 10A of FIG. 1A, according to some example embodiments. The control system comprises a cascaded feedback controller 210, a pulse width modulator (PWM) 220, a Voltage Source Inverter (VSI) 230, an electric motor 201, and a position observer 250. The cascaded feedback controller 210 comprises suitable circuitry configured to perform one or more functions of the feedback controller 210.

For example, the feedback controller 210 comprises a Clarke transformation-based current converter 203, a Park transformation-based current converter 205, adder circuitry 207, 211, proportional-integral (PI) controllers 209, 215, gain module 213, an inverse Park transformation-based voltage converter 217, and an inverse Clarke transformation-based voltage converter 219.

The measured three phase currents ($i_{abc}$) are transformed into two-phase system in stationary coordinates $i_{\alpha\beta}$ using the Clarke transformation-based current converter 203. Using the Park transformation-based current converter 205, the currents $i_{\alpha\beta}$ are transformed to a rotating two-phase $i\tau$ reference frame aligned with the stator current vector. The current PI controller 209 of the current control circuitry is of proportional-integral type and operates in the i-axis. The input to the current PI controller 209 is the error between the reference stator current magnitude $i^*_i$ and the measured stator current magnitude ($i_i$). The output of the current PI controller 209 is an offset with the resistance voltage drop to get the i-axis reference voltage ($v^*_i$). Using a gain provided by the gain module 213 and the output of the current PI controller 209, the active power ($\hat{P}_{mech}$) is estimated and is the input to the active power PI controller 215 of proportional-integral type. The output of the active power PI controller 215 is the τ-axis voltage reference ($v^*_\tau$). Using the inverse Park transformation-based voltage converter 217 and the inverse Clarke transformation-based voltage converter 219, the three-phase reference voltage ($v^*_{abc}$) is obtained that is output to the PWM modulator 220. The PWM modulator 220 generates the duty cycles $d^*_{abc}$ for the inverter 230 to control the electric motor 201.

The position observer 250 transforms the measured current ($i_{abc}$) into the two-phase stationary coordinates $i_{\alpha\beta}$ using Clarke transformation implemented by the Clarke transformation-based current converter 251. This stator current vector phase angle 253 $\angle i_{\alpha\beta}$ is tracked using a phase locked loop (PLL) 255 of proportional-integral type.

According to some example embodiments, the rotor position of a synchronous machine is defined as the axis with the maximum inductance path. Alternatively, some example embodiments consider the rotor position to be defined as the axis containing the magnets. The rotor reference frame is denoted by dq subscripts where the d-axis is aligned with the rotor position. FIG. 2B shows the relation of the dq-axes with the iτ-axes. FIG. 2B illustrates a vector representation of the iτ stator current reference frame where the i-axis is aligned with the stator current vector while the current in the i-axis 275 is expressed as $i_i=|i_{abc}|$. The current ($i_i$) 275 is the feedback to the current PI controller 209 and it produces the output voltage ($v^*_i$) 273. Based on this voltage, the active power is estimated and input to the active power controller 215 that produces the voltage ($v^*_\tau$) 277. Finally, the vector summation of the voltages 273 and 277 is the reference voltage ($V^*_{abc}$) 271 that is output to the PWM modulator 220. The β-axis corresponds to the q-axis while the α-axis corresponds to the d-axis. According to some example embodiments, the feedback controller 210 converges such that the i-axis is aligned with the q-axis in steady-state. Thus, by merely tracking the stator current, the position and speed of the rotor can be estimated. Also, as is illustrated in FIG. 2A, the control is dependent only on the stator resistance and uses no other machine parameters.

A rotor position is denoted by θ and an electrical angular speed is $\omega = s\,\theta$ where s is a differential operator d/dt. Estimated vectors are represented by superscript (^), called "hat". An orthogonal rotational matrix is $$J = \begin{bmatrix} 0 & -1 \\ 1 & 0 \end{bmatrix}$$

and I is an identity matrix. A model of the electric motor 201 is expressed in coordinates of an estimated rotor reference frame, denoted by subscript $\hat{d}\hat{q}$, whose $\hat{d}$-axis is at $\hat{\theta}=\theta-\tilde{\theta}$, where $\tilde{\theta}$ is a position error. Real space vectors are used, for example, a stator current is $i_{\hat{d}\hat{q}}=[i_{\hat{d}}, i_{\hat{q}}]^T$ where $i_{\hat{d}}$ and $i_{\hat{q}}$ are vector components in the estimated rotor reference frame. Space vectors in a stationary reference frame are denoted by subscript αβ. For the purpose of explanation, convention of a synchronous reluctance (SyR) machine is followed, i.e., d-axis is defined along the maximum inductance path.

In some embodiments, the electric motor 201 is a synchronous machine. A voltage equation of the synchronous machine in the rotor reference frame is given by:

$$s\,\lambda_{dq} = v_{dq} - R_s i_{dq} - \omega\,J\,\lambda_{dq} \qquad (1)$$

where $R_s$ is a stator resistance and $\lambda_{dq}$ is a stator flux linkage. The synchronous machine exhibits nonlinear magnetic characteristics due to both saturation and cross-saturation phenomenon. Equivalently, nonlinear stator flux linkage can be expressed as an operating point dependent linear magnetic model as:

$$\lambda_{dq} = L(i_{dq})\,i_{dq} + \lambda_m \qquad (2)$$

where an apparent inductance matrix L is a function of an operating point $i_{dq}$ in real dq rotor reference frame and $\lambda_m$ is an open circuit permanent-magnet flux linkage vector. The apparent inductance matrix L is given by:

$$L(i_{dq}) = \begin{bmatrix} L_d & 0 \\ 0 & L_q \end{bmatrix} \quad \lambda_m = \begin{bmatrix} 0 \\ -\lambda_m \end{bmatrix} \qquad (3)$$

where $\lambda_m$ is the open circuit permanent-magnet flux linkage and $L_d$, $L_q$ are apparent inductances along d and q-axis, respectively. An average electromagnetic torque is given by:

$$T = \frac{3p}{2} i_{dq}^T J\,\lambda_{dq} \qquad (4)$$

where p is a number of pole pairs.

The proposed control scheme has two objectives: (i) inject a constant stator current of magnitude $i^*_i$ and (ii) ensure the active power is driven to zero, $P_{mech}=0$, to mitigate the braking torque disturbances. To this end, the proportional-integral (PI) current controller 209 in the i-axis can be expressed in terms of the stator current magnitude error as:

$$v^*_i = \left(k_{pi} + \frac{k_{ii}}{s}\right)(i^*_i - i_i) + R_s i_i \qquad (5)$$

where $k_{pi}$ and $k_{ii}$ are the proportional and integral gains, respectively and the output is the reference voltage ($v^*_i$) 117 in the i-axis. The active power estimate ($\hat{P}_{mech}$) can be expressed using the gain 123 and the output voltage of the current controller 111 as $$\hat{P}_{mech} = \frac{3i_i}{2}(v_i^* - R_s i_i) \quad (6)$$

The orthogonal τ-axis controller 215 is used to regulate the active power ($\hat{P}_{mech}$) to zero. Thus, the τ-axis PI controller 215 is designed as the following:

$$v_\tau^* = \left(k_{p\tau} + \frac{k_{i\tau}}{s}\right)\hat{P}_{mech} \quad (7)$$

where $k_{p\tau}$ and $k_{i\tau}$ are the corresponding controller gains and the output is the reference voltage ($v^*_\tau$) in the τ-axis.

The controller gains are tuned by representing the control variables ($i_i$ and $P_{mech}$) in terms of the state variables ($i_i$ and γ). The PI gains of the current controller 209 are tuned for critically damped poles at $s=-\Omega_i$ as:

$$k_{pi} = \mu_i\, 2\,\Omega_i \quad k_{ii} = \mu_i\, \Omega_i^2 \quad (8)$$

The scaling factor $\mu_i$ is derived from the machine model in the stator reference frame as $$\mu_i = l_\Sigma + l_\Delta \cos(2\gamma) \quad (9)$$

where $$l_\Sigma = \frac{l_d + l_q}{2},\; l_\Delta = \frac{l_d - l_q}{2} \text{ and } \gamma = \angle i_{dq}.$$

Likewise, the PI gains of the τ-axis controller 215 are tuned for critically damped poles at $s=-\Omega_\tau$, as $$k_{p\tau} = \mu_\tau 2\,\Omega_\tau \quad k_{i\tau} = \mu_\tau \Omega_\tau^2 \quad (10)$$

The scaling factor is computed from the linearized model as $$\mu_\tau = \frac{i_i(l_\Sigma - l_\Delta \cos(2\gamma))}{\partial P_{mech}/\partial \gamma} \quad (11)$$

where the partial differential term can be expressed as $$\frac{\partial P_{mech}}{\partial \gamma} = \frac{3}{2}\omega\left(l_\Delta i_i^2\, 2\cos(2\gamma) - \lambda_m i_i \sin(\gamma)\right) \quad (12)$$

It is apparent that the scaling factors are operating point dependent. Hence, an approximate gain is computed using the nominal parameters at rated speed and considering the initial condition γ=0.

For positive angular speeds, the open-circuit back-emf due to the magnets in the negative q-axis is directed along the negative d-axis. Hence, the initial dq stator current evolves in the braking region in second/third quadrant. The negative mechanical active power ($P_{mech}$) is input to the τ-axis controller 215 that drives the phase of the stator current in the clockwise direction. This leads to the convergence of the stator currents to the zero-torque locus in the positive q-axis.

Figure 2C:
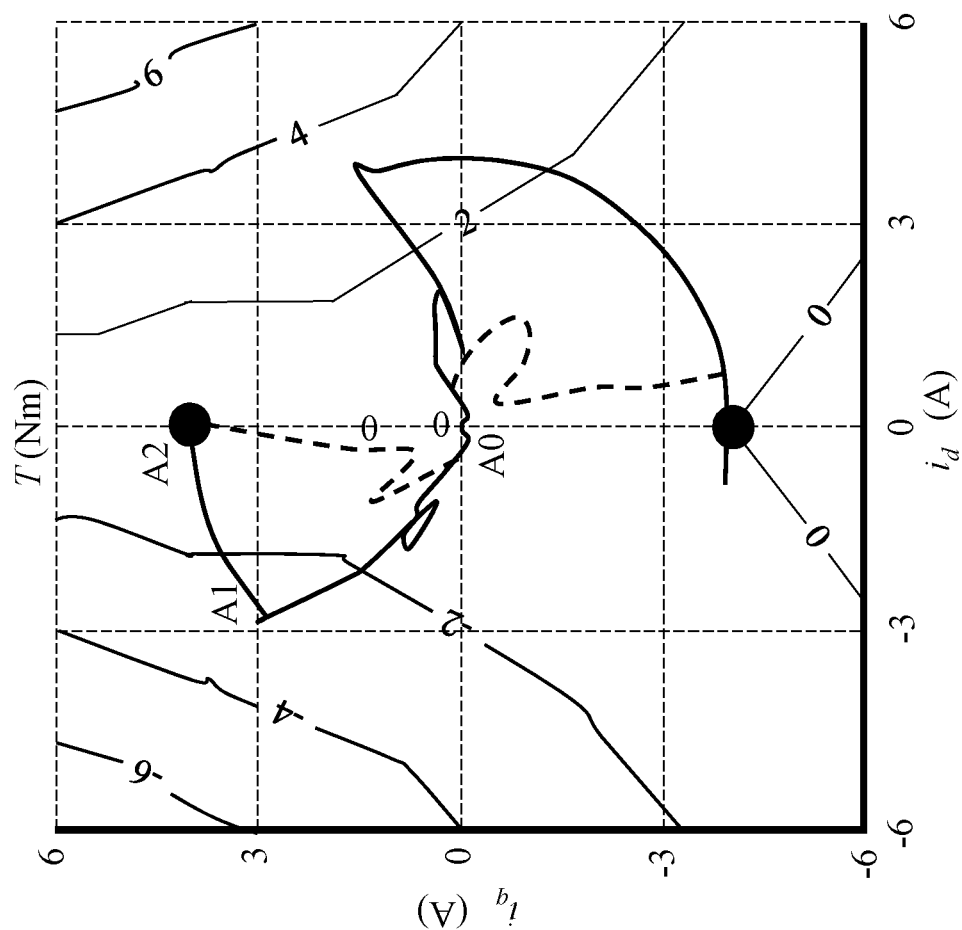
FIG. 2C illustrates a representation of evolution of the stator current trajectories in a rotor reference frame juxtaposed against the torque contour of a permanent magnet assisted synchronous reluctance machine, according to some example embodiments.

FIG. 2C illustrates the evolution of the stator current trajectories in the dq rotor reference frame juxtaposed against the torque contour of a permanent magnet assisted synchronous reluctance machine, according to some example embodiments. The results for the flying start at positive rated speed (shown in the arc between points A0-A1-A2) appear in the negative torque region and converge to the zero-torque locus in the positive q-axis. The solid curves between A0-A1-A2 correspond to the test with slow τ-axis dynamics to help illustrate the convergence where the stator current magnitude is observed to be regulated at $i^*_i=i_i=4$ A by the current PI controller 209 and the phase of the stator current vector is pushed towards and settles at the q-axis by the active power PI controller 215 where the torque is zero.

Similar discussion follows for the flying start at negative angular speed where the currents evolve in the positive torque region in first/fourth quadrant. However, to ensure that the stator currents settle in the zero-torque locus in the negative q-axis, the maximum $i_i$ should be limited to $$i_i < \frac{\lambda_m}{L_q} \quad (13)$$

No such limitation on $i_i$ exist for synchronous reluctance machines without magnets.

A phase-locked-loop (PLL) 257 with a proportional-integral (PI) controller may be employed to drive the error signal ε to zero as:

$$\hat{\omega} = k_p\,\epsilon + \int k_i\,\epsilon\, dt \quad \hat{\theta} = \int \hat{\omega}\, dt \quad (14)$$

where $k_p$ and $k_i$ are the respective gains; the gains are tuned for critically damped poles at $s=-\Omega_\omega$. The position error signal to track the stator current is given by:

$$\epsilon = \angle i_{\alpha\beta} - \hat{\theta} \quad (15)$$

where $\hat{\theta}$ is the estimated position. Note that the PLL converges to the q-axis and a correction of $\pm\pi/2$ based on the direction of angular speed is necessary to orient along the d-axis.

Figure 2D:
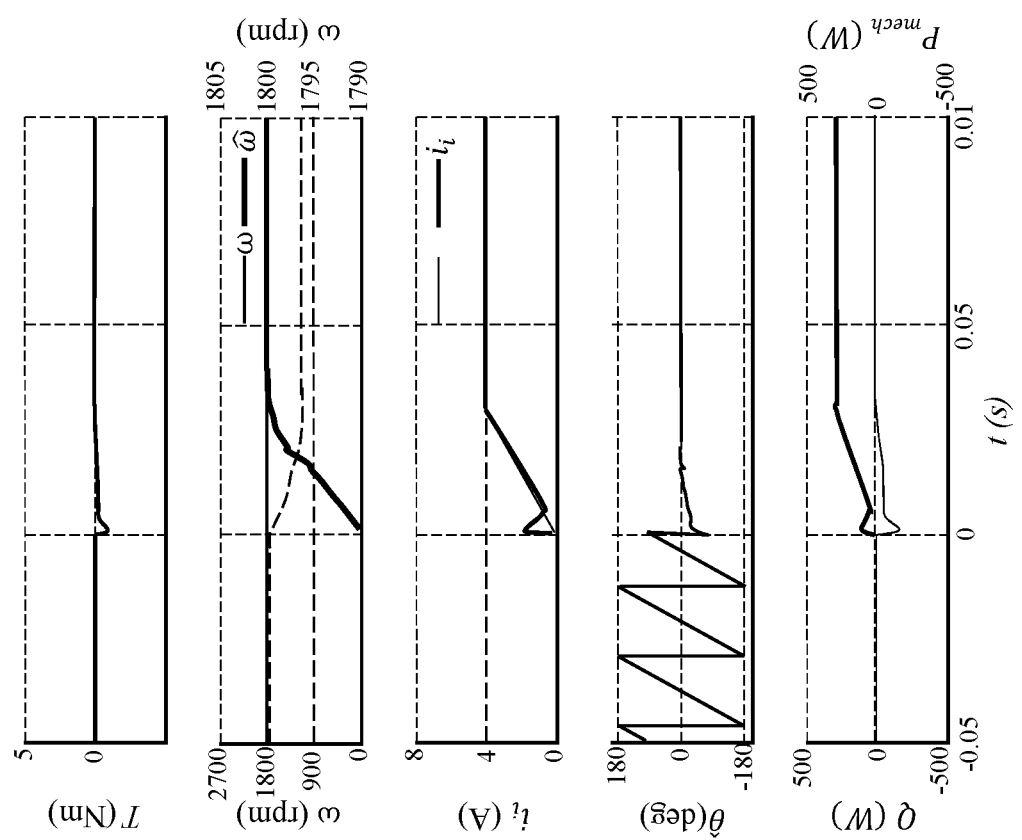
FIG. 2D illustrates a timing diagram of a flying start method for a three-phase synchronous motor, according to some example embodiments.

FIG. 2D illustrates a timing diagram of a flying start method for a three-phase synchronous motor, according to some example embodiments. The proposed flying start method uses reactive power injection at positive rated speed. Once the drive is powered-up at t=0s, barring a small transient, the braking torque remains negligible, and the position error converges to zero. It is worth pointing out that the rotor remains largely unperturbed and the speed nearly constant with a speed reduction less than 5 rpm.

The feedback controller described in the example embodiments estimates the rotor position without any position sensor, thereby resulting in numerous advantages, for example, reduced hardware complexity and lower cost, reduced size of drive machine, elimination of sensor cable, better noise immunity, and less maintenance requirements.

Figure 3:
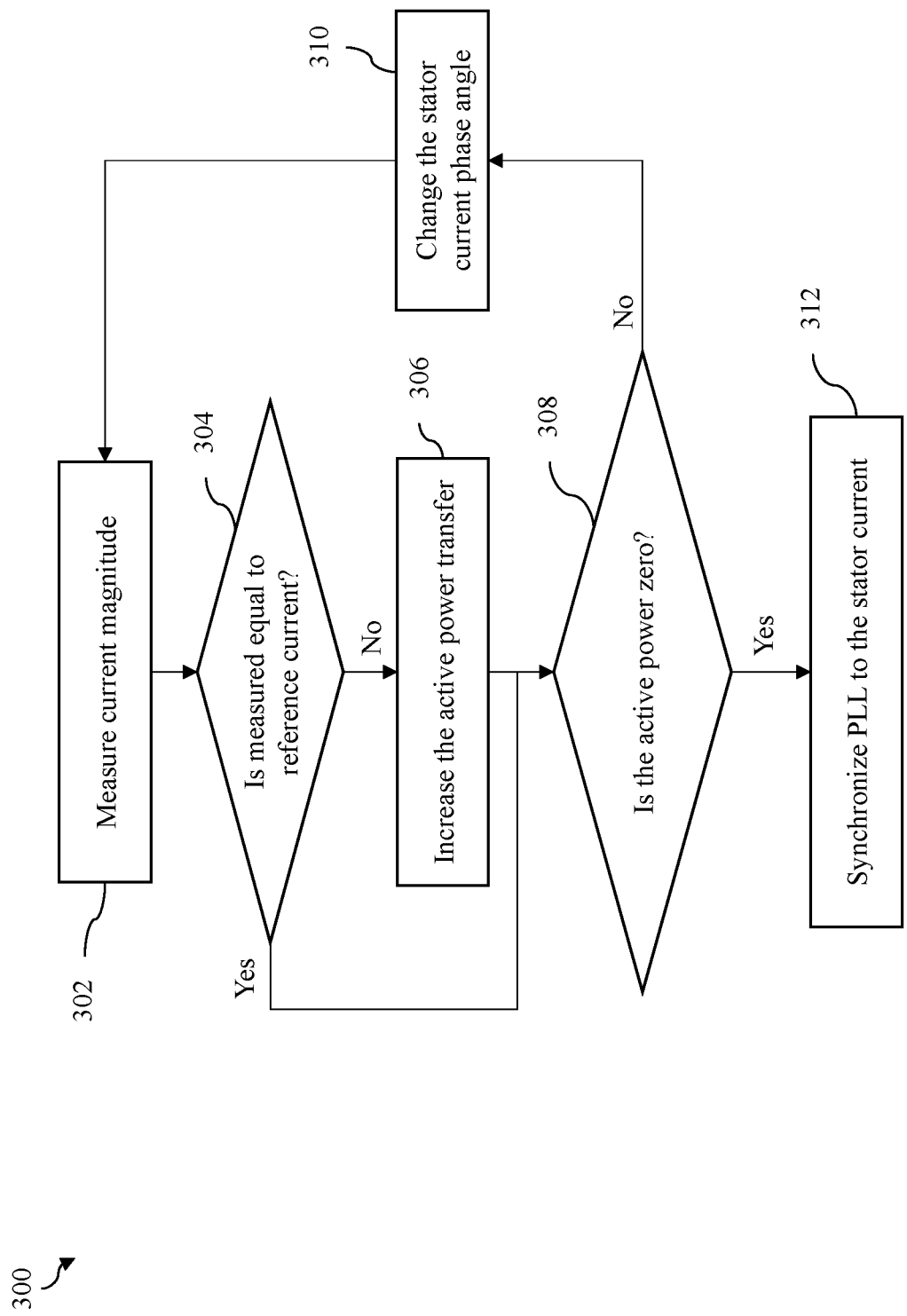
FIG. 3 illustrates a flowchart of a flying start method for a three-phase synchronous motor, according to some example embodiments.

FIG. 3 illustrates a flowchart of a flying start method 300 for a three-phase synchronous motor, according to some example embodiments. The flying start method comprises measuring 302 the current magnitude of the stator current. In this regard, the approaches outlined with reference to FIGS. 1A-2A may be utilized. The method 300 also comprises determining 304 whether the measured current magnitude is equal to the reference current. In this regard, the reference current may be predefined or may be set dynamically. The step 304 may be performed by a suitable processing circuitry. If the outcome of step 304 does not yield a match (i.e., outcome is "No") between the measured current magnitude and the reference current, the control of steps passes to step 306 where the active power transfer to the machine is increased and control is transferred to step 308. However, if the outcome of step 304 does yield a match (i.e., outcome is "Yes") between the measured current magnitude and the reference current, the control of steps directly passes to step 308 where a check is performed as to whether the active power to the machine is zero. If the outcome of step 308 indicates that active power is non-zero (i.e., outcome is "No"), the control of steps passes to step 310 where the stator current phase angle is changed, and control is transferred back to step 302. However, if the outcome of step 308 indicates that active power is zero (i.e., outcome is "Yes"), the method 300 proceeds to synchronizing the PLL to the stator current to estimate the mechanical states of the rotor.

In this way, without using a position sensor, the flying start method can be executed by suitable estimation of the mechanical states of the electric motor in the manner described above. Therefore, the motor driver is relieved of the need to have complex hardware and is no longer prone to errors in the measurements provided by the position sensor.

Some components such as the PLL, PI controllers, the active power controller, and the current controller may be embodied as processing circuitries operatively connected to other electronic components as per need. In this regard, FIG. 4 illustrates a block diagram of a system for implementing some components of the control system of FIG. 1A, according to some example embodiments.

The component 411 includes a processor 440, a computer readable memory 412, storage 458 and user interface 449 with optional display 452 and keyboard 451, which are connected through bus 456. For example, the user interface 464 in communication with the processor 440 and the computer readable memory 412, acquires and stores the data in the computer readable memory 412 upon receiving an input from a surface, keyboard 453, of the user interface 457 by a user.

The component 411 can include a power source 454, depending upon the application the power source 454 may be optionally located outside of the component 411. Linked through bus 456 can be a user input interface 457 adapted to connect to a display device 448, wherein the display device 448 can include a computer monitor, camera, television, projector, or mobile device, among others. A network interface controller (NIC) 434 is adapted to connect through the bus 456 to a network 436, wherein image data or other data, among other things, can be rendered on a third-party display device, third party imaging device, and/or third-party printing device outside of the component 411.

Figure 4:
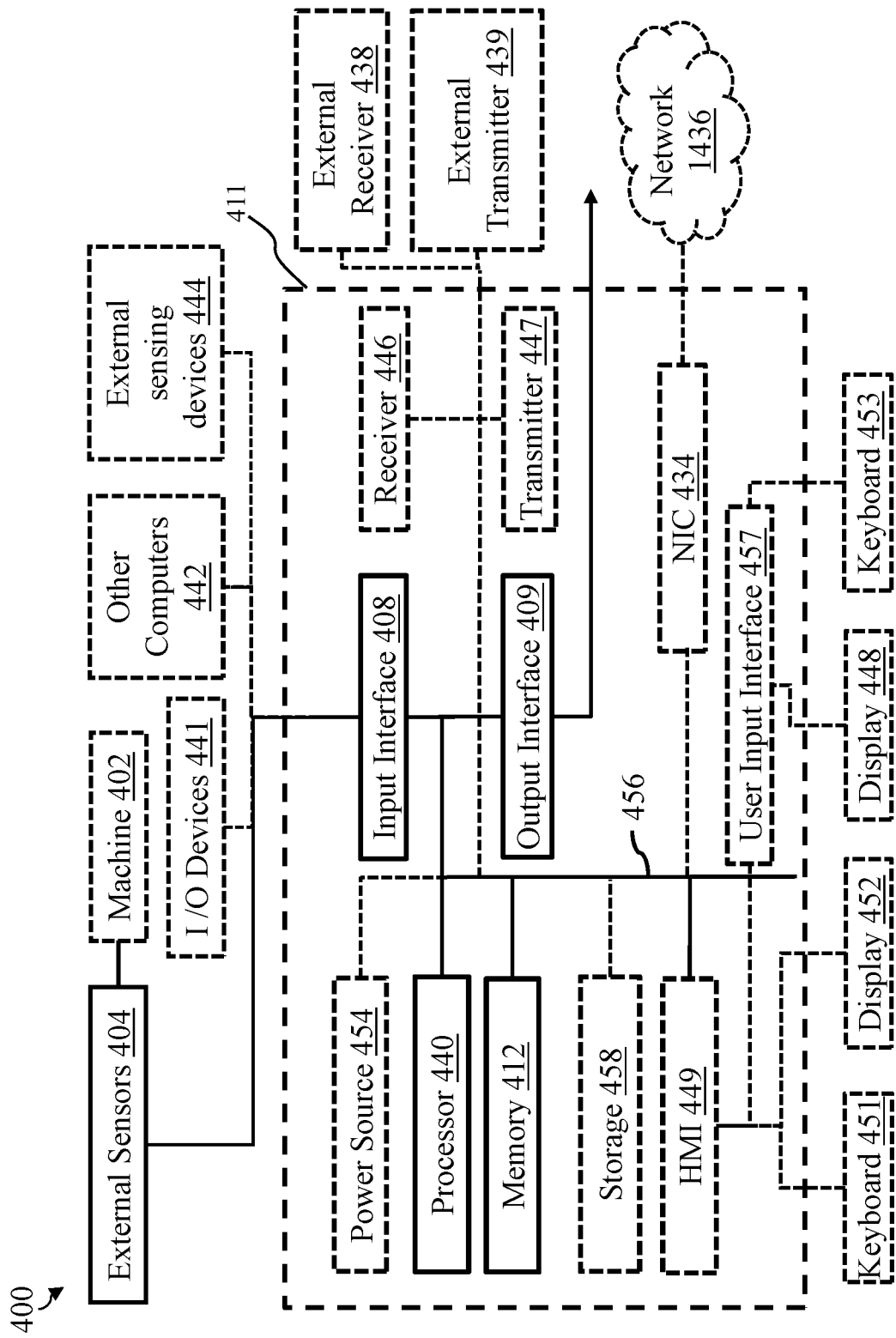
FIG. 4 illustrates a block diagram of a system for implementing some components of the control system of FIG. 1A, according to some example embodiments.

Still referring to FIG. 4, electronic data, among other things, may be transmitted over a communication channel of the network 436, and/or stored within the storage system 458 for storage and/or further processing. Further, the time series data or other data may be received wirelessly or hard wired from a receiver 446 (or external receiver 438) or transmitted via a transmitter 447 (or external transmitter 439) wirelessly or hard wired, the receiver 446 and transmitter 447 are both connected through the bus 456. The component 411 may be connected via an input interface 408 to external sensing devices 944 and external input/output devices 441. For example, the external sensing devices 404 may include sensors gathering data before-during-after of the collected time-series data of the machine. The component 411 may be connected to other external computers 442. An output interface 409 may be used to output the processed data from the processor 440. It is noted that a user interface 449 in communication with the processor 440 and the non-transitory computer readable storage medium 412, acquires and stores data in the non-transitory computer readable storage medium 4912 upon receiving an input from a surface of the user interface 449 by a user.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A cascaded controller for controlling a kinetic three-phase synchronous machine, comprising:
a current control circuitry configured to regulate a magnitude of inrush stator current for a stator of the kinetic three-phase synchronous machine by producing a first voltage control signal causing a flow of active power in the kinetic three-phase synchronous machine,
wherein the current control circuitry is further configured to:
accept a measure of the inrush stator current; and
produce the first voltage control signal, based on the measure of the inrush stator current, and
wherein a voltage powering the kinetic three-phase synchronous machine is modulated based on the first voltage control signal such that the modulated voltage reduces a first error between the measure of the inrush stator current and a reference value of the inrush stator current, and
wherein the modulated voltage reduces a second error between an estimated value of the active power and a reference value of the active power; and
an active power control circuitry operatively coupled with the current controller circuitry and configured to produce a second voltage control signal to reduce the active power to zero, based on the first voltage control signal,
wherein the second voltage control signal controls a phase angle of the inrush stator current such that a stator current vector of the inrush stator current is oriented to align with a magnet axis of the rotor.

2. The cascaded controller of claim 1, wherein the estimated value of the active power is computed based on the first voltage control signal of the current control circuitry.

3. The cascaded controller of claim 2, wherein the active power control circuitry is further configured to receive the estimated value of the active power and generate the second voltage control signal based on the estimated value of the active power.

4. The cascaded controller of claim 3, further comprising a modulator configured to generate corresponding duty cycles for pulse width modulation (PWM) of the voltage powering the kinetic three-phase synchronous machine, based on a cumulative of the first voltage control signal and the second voltage control signal.

5. The cascaded controller of claim 1, further comprising a position observer circuitry configured to accept a measure of the inrush stator current and estimate one or more state parameters of a rotor of the kinetic three-phase synchronous machine based on the measure.

6. The cascaded controller of claim 5, wherein the one or more state parameters of the rotor comprise a mechanical speed of the rotor and a position of the rotor.

7. The cascaded controller of claim 5, wherein the stator current vector is in three phases, each one of the three phases uniquely defined along one of a-axis, b-axis, and c-axis, and wherein the position observer circuitry comprises:
a converter circuit configured to convert the stator current vector in three phases to an equivalent current in a two-phase stationary reference frame using Clarke transformation, wherein the two-phase stationary reference frame is defined by an α-axis aligned with the a-axis of the three phases of the stator current vector and a ß-axis orthogonal to the α-axis;
a phase extraction circuit configured to determine a phase of the equivalent current in the two-phase stationary reference frame; and
a phase-locked loop circuit configured to estimate the one or more state parameters of the rotor.

8. The cascaded controller of claim 1, wherein the stator current vector is in three phases, each one of the three phases uniquely defined along one of a-axis, b-axis, and c-axis, and wherein the cascaded controller further comprises a converter circuit configured to:
convert the stator current vector in three phases to an equivalent current in a two-phase stationary reference frame using Clarke transformation, wherein the two-phase stationary reference frame is defined by an α-axis aligned with the a-axis of the three phases of the stator current vector and a ß-axis orthogonal to the α-axis;
convert the equivalent current in the two-phase stationary reference frame to a current in two-phase rotating reference frame using Park transformation, wherein the two-phase rotating reference frame is defined by an i-axis aligned with the stator current vector and a T-axis orthogonal to the i-axis.

9. The cascaded controller of claim 8, wherein the current control circuitry comprises a first proportional-integral (PI) controller configured to produce the first voltage control signal, based on a first error between a component of the stator current vector along the i-axis and a reference value of the inrush stator current, wherein the first voltage control signal is along the i-axis.

10. The cascaded controller of claim 9, wherein the active power control circuitry comprises a second PI controller configured to produce the second voltage control signal, based on a second error between an estimated value of the active power and a reference value of the active power, wherein the estimated value of the active power is proportional to the first voltage control signal along the i-axis, and wherein the second voltage control signal is along the t-axis.

11. The cascaded controller of claim 10, wherein the converter circuit is further configured to transform the first voltage control signal along the i-axis and the second voltage control signal along the τ-axis to a cumulative voltage in three phases using inverse Park transformation and inverse Clarke transformation.

12. The cascaded controller of claim 11, further comprising a modulator configured to generate corresponding duty cycles for pulse width modulation (PWM) of a voltage powering the kinetic three-phase synchronous machine, based on the cumulative voltage in three phases.

13. A control method for controlling a kinetic three-phase synchronous machine, the method comprising:
producing a first voltage control signal causing a flow of active power in the kinetic three-phase synchronous machine to regulate a magnitude of inrush stator current for a stator of the kinetic three-phase synchronous machine; and
producing a second voltage control signal to reduce the active power to zero, based on the first voltage control signal,
wherein the second voltage control signal controls a phase angle of the inrush stator current such that a stator current vector of the inrush stator current is oriented to align with a magnet axis of the rotor,
accepting a measure of the inrush stator current; and
producing the first voltage control signal, based on the measure of the inrush stator current; and
modulating a voltage powering the kinetic three-phase synchronous machine, based on the first voltage control signal such that the modulated voltage reduces i.) a first error between the measure of the inrush stator current and a reference value of the inrush stator current and ii.) a second error between an estimated value of the active power and a reference value of the active power.

14. The control method of claim 13, further comprising generating corresponding duty cycles for pulse width modulation (PWM) of the voltage powering the kinetic three-phase synchronous machine, based on a cumulative of the first voltage control signal and the second voltage control signal.

15. The control method of claim 13, wherein the stator current vector is in three phases, each one of the three phases uniquely defined along one of a-axis, b-axis, and c-axis, and wherein the control method further comprises:
converting the stator current vector in three phases to an equivalent current in a two-phase stationary reference frame using Clarke transformation, wherein the two-phase stationary reference frame is defined by an α-axis aligned with the a-axis of the three phases of the stator current vector and a ß-axis orthogonal to the α-axis;
converting the equivalent current in the two-phase stationary reference frame to a current in two-phase rotating reference frame using Park transformation, wherein the two-phase rotating reference frame is defined by an i-axis aligned with the stator current vector and a τ-axis orthogonal to the i-axis.

16. The control method of claim 15,
wherein the first voltage control signal is produced based on a first error between a component of the stator current vector along the i-axis and a reference value of the inrush stator current, wherein the first voltage control signal is along the i-axis, and
wherein the second voltage control signal is produced based on a second error between an estimated value of the active power and a reference value of the active power, wherein the estimated value of the active power is proportional to the first voltage control signal along the i-axis, and wherein the second voltage control signal is along the τ-axis.

* * * * *